United States Patent
Lipka

(10) Patent No.: US 8,428,546 B2
(45) Date of Patent: Apr. 23, 2013

(54) BASEBAND SIGNAL PROCESSING TECHNIQUE

(75) Inventor: Dietmar Lipka, Berg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 404 days.

(21) Appl. No.: 12/934,680

(22) PCT Filed: Mar. 17, 2009

(86) PCT No.: PCT/EP2009/053126
§ 371 (c)(1),
(2), (4) Date: Mar. 17, 2009

(87) PCT Pub. No.: WO2009/118257
PCT Pub. Date: Oct. 1, 2009

(65) Prior Publication Data
US 2011/0014889 A1 Jan. 20, 2011

Related U.S. Application Data

(60) Provisional application No. 61/040,035, filed on Mar. 27, 2008.

(30) Foreign Application Priority Data

Mar. 26, 2008 (EP) ..................... 08005625

(51) Int. Cl.
*H04B 1/16* (2006.01)
*H04B 1/10* (2006.01)

(52) U.S. Cl.
USPC .......................... 455/340; 455/296

(58) Field of Classification Search ................. 455/118,
455/296, 313, 318, 323, 339, 340
See application file for complete search history.

(56) References Cited

U.S. PATENT DOCUMENTS

| | | | | |
|---|---|---|---|---|
| 4,262,361 A * | 4/1981 | Hauer | | 455/113 |
| 6,054,908 A * | 4/2000 | Jackson | | 333/174 |
| 6,738,604 B2 * | 5/2004 | Swazey | | 455/118 |
| 7,299,029 B2 * | 11/2007 | Elder et al. | | 455/333 |
| 7,613,439 B2 * | 11/2009 | Kavadias | | 455/260 |
| 7,778,613 B2 * | 8/2010 | Seendripu et al. | | 455/130 |
| 2001/0008549 A1 | 7/2001 | Hashimoto | | |
| 2003/0027534 A1 | 2/2003 | Swazey | | |
| 2003/0081706 A1 * | 5/2003 | Ciccarelli et al. | | 375/350 |

* cited by examiner

*Primary Examiner* — Blane J Jackson
(74) *Attorney, Agent, or Firm* — Roger S. Burleigh

(57) ABSTRACT

A baseband processing technique is described that permits to process in an analog signal domain a complex-valued baseband signal to laterally remove interference components resulting, for example, from in-band blocking signals. In an exemplary device implementation, the baseband processing device is configured to receive a baseband signal having a designated signal bandwidth defined by two opposite band edges, wherein a first frequency shift in a first direction toward a first band edge is impressed on the baseband signal. The device comprises a first filter stage adapted to filter the baseband signal exhibiting the first frequency shift to remove interference components behind the first band edge, a frequency shifter stage adapted to shift the filtered baseband signal by a second frequency shift in a second direction opposite the first direction towards a second band edge, and a second filter stage adapted to filter the baseband signal exhibiting the second frequency shift to remove interference components behind the second band edge.

18 Claims, 3 Drawing Sheets

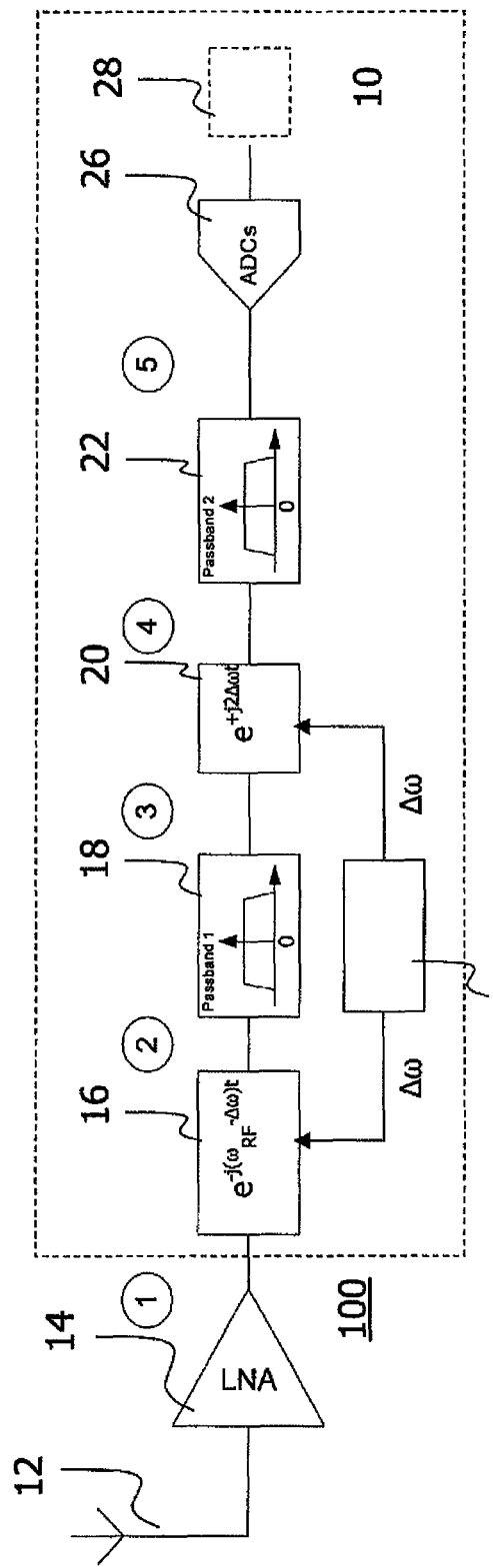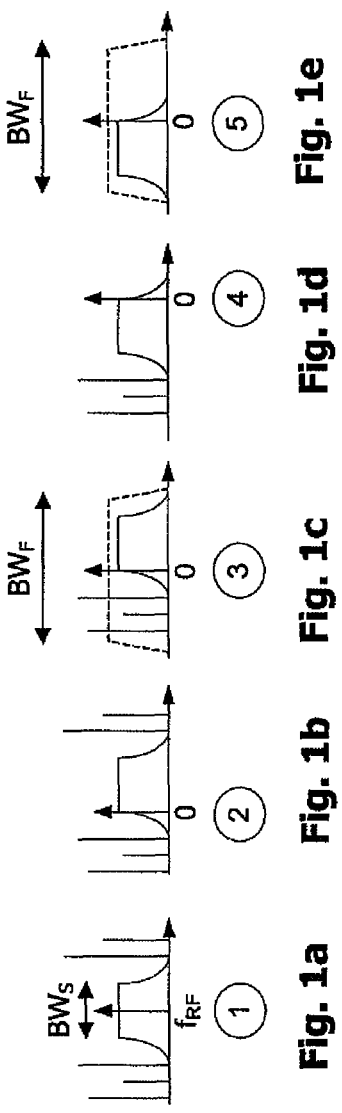

200

```
┌─────────────────────────────────┐
│ SUBJECT A BASEBAND SIGNAL EX-   │
│ HIBITING A FIRST FREQUENCY SHIFT│
│ TO A FIRST FILTERING OPERATION TO│
│ REMOVE INTERFERENCE COMPONENTS  │
│ BEHIND A FIRST BAND EDGE        │
└─────────────────────────────────┘  ⟍ 202
              │
              ▼
┌─────────────────────────────────┐
│ SHIFT THE FILTERED BASEBAND     │
│ SIGNAL BY A SECOND FREQUENCY    │
│ SHIFT IN A SECOND DIRECTION     │
│ OPPOSITE THE FIRST FREQUENCY    │
│ SHIFT                           │
└─────────────────────────────────┘  ⟍ 204
              │
              ▼
┌─────────────────────────────────┐
│ SUBJECT THE BASEBAND SIGNAL EX- │
│ HIBITING THE SECOND FREQUENCY   │
│ SHIFT TO A SECOND FILTERING     │
│ OPERATION TO REMOVE             │
│ INTERFERENCE COMPONENTS BEHIND  │
│ A SECOND BAND EDGE              │
└─────────────────────────────────┘  ⟍ 206
```

Fig. 2

BASEBAND SIGNAL PROCESSING TECHNIQUE

PRIORITY CLAIM

This application claims the benefit of U.S. Provisional Application No. 61/040,035, filed Mar. 27, 2008, and EP 08005625.2, filed Mar. 26, 2008 the disclosures of which are fully incorporated herein by reference.

TECHNICAL FIELD

The present invention generally relates to baseband signal processing. In particular, the invention is directed at processing a baseband signal in the analog domain to remove interference components.

BACKGROUND

Next generation cellular communications systems including the Long Term Evolution (LTE) system currently being standardized by the Third Generation Partnership Project (3GPP) support higher data rates than existing cellular communications systems such as the Universal Mobile Telecommunications System (UMTS) and the Global System for Mobile communications (GSM). The higher data rates require a larger frequency bandwidth for each physical channel. While GSM systems use a channel bandwidth of 0.2 MHz, UMTS systems have a channel bandwidth of already 5 MHz, and next generation systems will support channel bandwidths of up to 20 MHz and more.

The LTE standard for example defines a maximum channel bandwidth of 20 MHz which can be adjusted in steps of 1.25 MHz. The feature of an adjustable channel bandwidth increases the usage flexibility with respect to available spectrum resources and additionally permits a smooth migration from GSM and UMTS systems. During the migration phase it may be desired to use the radio frequency spectrum currently assigned to GSM and UMTS systems also by LTE systems. The resulting co-existence of multiple cellular communications system within a limited radio frequency spectrum gives rise to new challenges.

System operators may want to fill in the co-existence phase unused portions of their spectrum resources originally allocated to GSM or UMTS services with high data rate LTE services. According to the current allocation schemes, this filling can be done with a bandwidth granularity of 180 kHz at a frequency grid size of 100 kHz. Given such a high bandwidth granularity and small frequency grid size, the filling may lead to situations in which a narrow band signal (e.g. a GSM signal) comes very close to an LTE band edge. Consequently, GSM signal interferences in the LTE band may occur.

As a result of such interference from GSM signals, the LTE receiver performance will be degraded. The specific amount of receiver performance degradation in the presence of an interference signal depends on the blocking capabilities of the receiver. The receiver blocking capability is a measure of the receiver ability to receive a desired signal at its assigned frequency in the presence of interference on frequencies other than those of the adjacent channels. Such interference is sometimes also referred to as in-band blocking.

In-band blocking resulting, for example, from a GSM signal being closely located to an LTE band edge is difficult to filter out using an analog receiver filter due to the large and potentially variable signal bandwidths of up to 20 MHz. Even filters having a switchable bandwidth capability are not useful here because the typical switching granularities are by far not sufficient to cope with all possible co-existence scenarios. If, for example, the filter bandwidth can be selected in steps of 5 MHz and the LTE signal bandwidth is around 6 MHz, the filter bandwidth may be set to 10 MHz. Such a filter setting will, however, leave laterally 2 MHz on each side of the signal spectrum where blocking signals are not filtered at all. To cope with blocking signals in such situations, analog-to-digital converters (ADC) with an extremely high resolution of possibly more than 16 bit are needed. However, ADCs having such a high resolution and additionally providing the required sample rates of more than 30 mega samples per second (Msps) are currently not available.

EP 1 156 589 A teaches an approach for processing a Digital Radio Mondial (DRM) intermediate frequency (IF) signal in a situation in which an IF bandpass filter bandwidth (of e.g. 20 kHz) is larger than the signal bandwidth (of e.g. 10 kHz). In such a situation, the oscillation frequency of a down-conversion stage preceding the IF filter may be detuned such that an unwanted signal portion behind one of the DRM signal edges lies outside the passband of the IF filter. Since DFM systems use a two-step down-conversion, the detuning and bandpass filtering steps may be repeated in further down-conversion and filter stages to additionally remove an unwanted signal portion behind the other DRM signal edge.

The approach taught in EP 1 156 589 A pertains to an IF signal processing stage and can therefore not be applied to baseband signals. Moreover, baseband processing does not involve a two-step down-conversion, and it is therefore evident that performing only one of the two filtering operations proposed in EP 1 156 589 A would not be helpful to remove interference components behind both signal edges of a (complex-valued) baseband signal.

SUMMARY

Accordingly, there remains a need for a baseband signal processing technique that efficiently improves the blocking capability of a receiver.

According to a first aspect, a baseband processing device adapted to process in an analog signal domain a complex-valued baseband signal to laterally remove interference components is provided, wherein the baseband signal has a designated signal bandwidth defined by two opposite band edges and wherein a first frequency shift in a first frequency direction is impressed on the baseband signal. The device comprises a first filter stage adapted to filter the baseband signal exhibiting the first frequency shift to remove interference components behind a first band edge, a frequency shifter stage adapted to shift the filtered baseband signal by a second frequency shift in a second frequency direction opposite the first frequency direction, and a second filter stage adapted to filter the baseband signal exhibiting the second frequency shift to remove interference components behind a second band edge.

The baseband signal as processed in a receiver has a designated signal bandwidth that corresponds to the signal bandwidth of the baseband signal generated within the transmitter. The actual signal bandwidth of the baseband signal as processed in the receiver may be larger than the designated signal bandwidth, and the filter stages may be adapted to reduce the actual signal bandwidth of the baseband signal to the designated signal bandwidth. During this signal bandwidth reduction any interference components outside the designated signal bandwidth of the baseband signal can thus be removed.

The baseband signal may be a wideband signal having a designated signal bandwidth in the megahertz range (e.g. from 1 to 50 MHz).

In one implementation, two or more designated baseband signal bandwidths are defined. A specific signal bandwidth for the baseband signal may be selected by a transmitter either autonomously or in response to an external control signal. In such situations, a receiver may have no a priori knowledge of the bandwidth settings of the transmitter (i.e. of the designated signal bandwidth).

During the baseband processing, the baseband signal is subjected at least to a second frequency shift before the second filter stage. Optionally, the baseband signal may be subjected to a first frequency shift before the first filter stage and to a third frequency shift after the second filter stage. The third frequency shift may be performed to compensate either one or both of the first frequency shift and the second frequency shift. In one implementation, the third frequency shift is performed by a third frequency shifter stage located in the analog signal domain. In another implementation, the third frequency shift is performed in the digital signal domain.

The absolute value of the second frequency shift may be correlated with the absolute value of the first frequency shift. The absolute value of the second frequency shift may, for example, amount to twice the absolute value of the first frequency shift. In such a case, both frequency shifts may be interpreted to result in a symmetric shifting of the baseband signal around a centre frequency (the centre frequency of the—complex-valued—baseband signal may be 0 Hz). Of course, the relationship between the first frequency shift and the second frequency shift may also be selected such that an asymmetric shifting with respect to a centre frequency is obtained.

A symmetric shifting can be obtained if the first frequency shift amounts to $\frac{1}{2}$ ($BW_F-BW_S$) and the second frequency shift amounts to ($BW_F-BW_S$), with $BW_S$ being the designated signal bandwidth, $BW_F$ being a system parameter and $BW_F > BW_S$. The designated signal bandwidth $BW_S$ may be a fixed, predefined value a priori known to a receiver or a value that depends on specific system settings. The system parameter $BW_F$ may likewise be a fixed, predefined system parameter a priori known to the receiver or a multi-value system parameter that is set as needed. The system parameter $BW_F$ may, for example, be selected to correspond to a bandwidth capability of a mobile communications system. In an exemplary LTE context, the system parameter $BW_F$ may be set in the megahertz range (e.g. to 20 MHz corresponding to the maximum channel bandwidth or to any other valid channel bandwidth value).

The first filter stage and the second filter stage may have the same filter characteristic, or they may have different filter characteristics. In one implementation, each of the first filter stage and the second filter stage has a low-pass filter characteristic. In other implementations, at least one of the first filter stage and the second filter stage may have another filter characteristic, for example a bandpass characteristic.

The filter characteristic of each of the first filter stage and the second filter stage may be characterised by a characteristic frequency or frequency range $BW_F$. In the case the first filter stage and the second filter stage have a low-pass characteristic, the characteristic frequency $BW_F$ may be indicative of a filter bandwidth or passband. As already mentioned above, the characteristic frequency or frequency range $BW_F$ may be a system parameter selected to correspond to a bandwidth capability of a mobile communication system.

At least one of the first filter stage and the second filter stage may have a fixed filter characteristic. According to an alternative implementation, at least one of the first filter stage and the second filter stage has a switchable or adjustable filter characteristic.

It has already been mentioned above that the designated signal bandwidth $BW_S$ may be a multi-value system parameter a priori not known to a receiver. In such a case, the baseband processing device may additionally comprise a detector adapted to determine the designated signal bandwidth $BW_S$. The detector may, for example, be configured to listen to a communication channel on which information relating to the designated signal bandwidth is transmitted. In another implementation, the detector may be configured to analyse the down-converted baseband signal in order to determine the designated signal bandwidth $BW_S$. Of course, the detector could also be configured in any other way.

The detector may be coupled to the frequency shifter stage to control the second frequency shift in accordance with the determined designated signal bandwidth. In case additional frequency shifter stages are provided (for example to impress the first and/or the third frequency shift on the baseband signal), the detector may additionally be coupled to one or more of these further frequency shifter stages to control the frequency shift impressed by the respective frequency shifter stage in accordance with the determined designated signal bandwidth.

The baseband processing device may additionally comprise a down-converter adapted to down-convert a radio frequency (RF) signal to produce the baseband signal. The down-converter may additionally be adapted to impress the first frequency shift on the RF signal during down-conversion. In an alternative implementation, a designated further frequency shifter stage is arranged upstream of the first filter stage (and downstream of the down-converter) to impress the first frequency shift on the down-converted baseband signal.

According to one variant, the baseband processing device additionally comprises an analog-two-digital converter stage adapted to convert an output signal of the second filter stage to a digital signal domain. In such a case, the device may additionally comprise a signal processor located in the digital signal domain and adapted to compensate at least one of the first frequency shift and the second frequency shift. This compensation may result in a re-centring of the baseband signal in the digital domain about a centre frequency (of e.g. 0 Hz).

The baseband signal processed by the baseband processing device may include two quadrature signal components. In such a situation, a dedicated signal branch may be provided for each quadrature signal component, and the first and second filter stages as well as the one or more frequency filter stages may stretch across the two signal branches. In other words, the first and second filtering operations as well as the one or more frequency shifting operations may be performed individually in each signal branch.

The baseband processing device may be included in a receiver, and the receiver may belong to a cellular communications system. In one realisation, the receiver is included in a mobile terminal such as a mobile telephone, a notebook, a network or data card or a Personal Digital Assistant (PDA). The receiver could also be included in a stationery component such as a base station of the cellular communications system.

According to a further aspect, a method of processing in an analog signal domain a complex-valued baseband signal to laterally remove interference components is provided, wherein the baseband signal has a designated signal bandwidth defined by two opposite band edges and wherein a first frequency shift in a first frequency direction is impressed on the baseband signal. The method comprises the steps of subjecting the baseband signal exhibiting the first frequency shift to a first filtering operation to remove interference components behind a first band edge, shifting the filtered baseband signal by a second frequency shift in a second frequency direction opposite the first frequency direction, and subjecting the baseband signal exhibiting the second frequency shift to a second filtering operation to remove interference components behind a second band edge.

The method may comprise additional steps as discussed above in context with the baseband processing device. For example, the method may further comprise the steps of determining the designated signal bandwidth and controlling the second (and any other) frequency shift in accordance with the determined designated signal bandwidth.

According to another aspect, a computer program product is provided that comprises program code portions for performing the steps presented herein when the computer program product is run (or executed) on a computing device such as a mobile terminal or a base station. The computer program product may be stored on a computer-readable recording medium, such as a CD-ROM, DVD, hard disk or semi-conductor memory. Moreover, the computer program product may be provided for download by a download server. The download may be performed, for example, via the Internet.

BRIEF DESCRIPTION OF THE DRAWINGS

In the following, the present invention will be described in more detail with reference to exemplary embodiments illustrated in the figures, in which FIG. 1 is a schematic illustration of an embodiment of a baseband processing device;

FIG. 2 is a schematic flow chart illustrating the processing steps performed in accordance with a method embodiment.

DETAILED DESCRIPTION OF PREFERRED EMBODIMENTS

Figure 3:
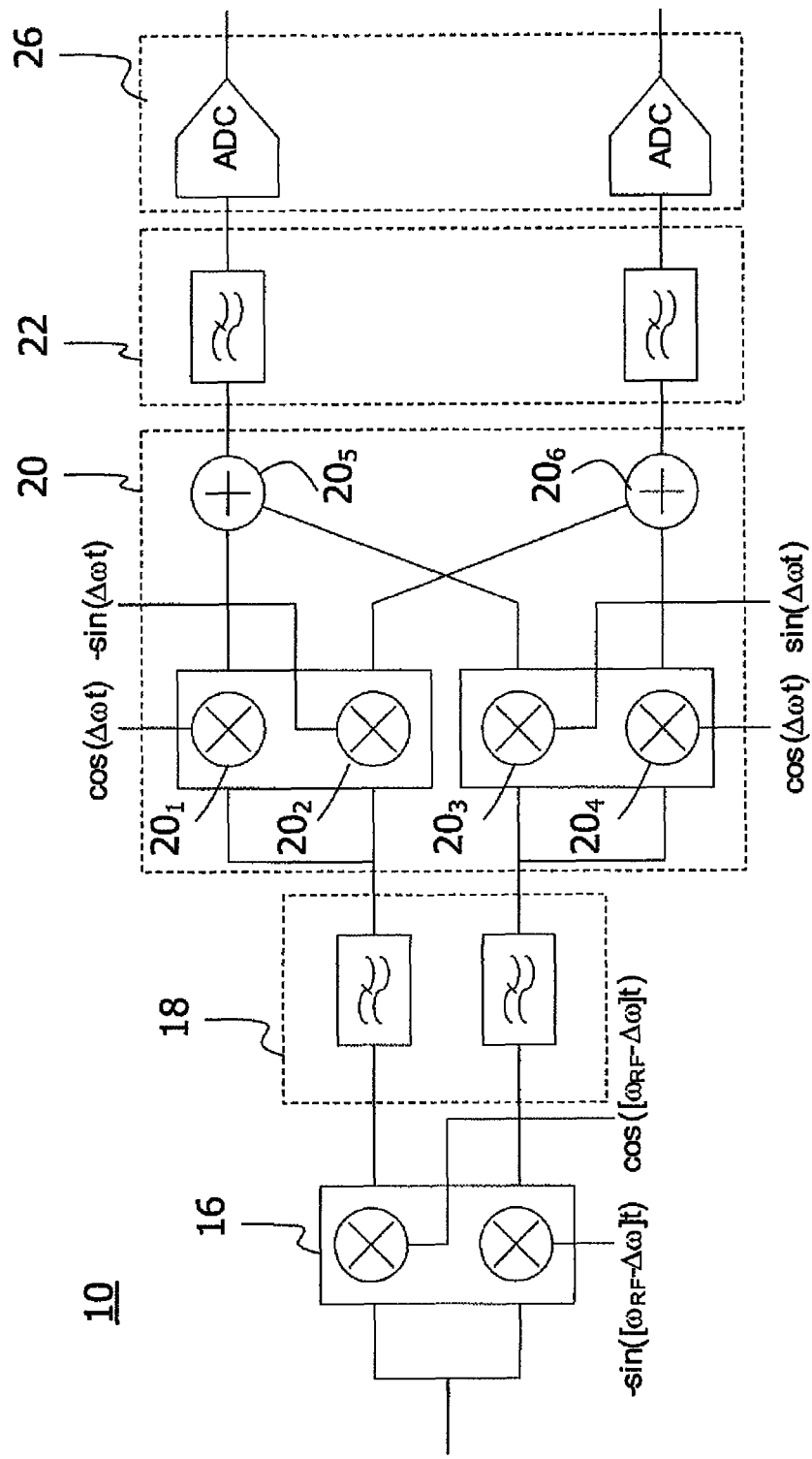
FIG. 3 is a schematic illustration of a baseband processing device of a further embodiment adapted to process a baseband signal including two quadrature signal components.

In the following description, for purposes of explanation and not a limitation, specific details are set forth, such as specific processing components, specific processing steps and specific orders of processing steps. It will be apparent to one skilled in the art that the present invention may be practised in other embodiments that depart from these specific details. For example, while the embodiments will be described in context with a next generation cellular communications system in accordance with the LTE standard, the invention could also be practised in connection with any other wireless or wired communications system.

Those skilled in the art will appreciate further that functions explained herein below may at least partially be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments will primarily be described with respect to individual components and method steps, the present invention may at least partially be embodied in a computer processor and memory coupled to a processor wherein the memory is encoded with one or more programs that perform the steps disclosed herein when the one or more products are executed by the processor.

Referring now to the drawings, FIG. 1 schematically illustrates a baseband processing device 10. The baseband processing device 10 is incorporated in a mobile terminal 100 such as a mobile telephone or a data or network card. The mobile terminal 100 comprises a plurality of further components, but only two RF components including an antenna 12 and a Low Noise Amplifier (LNA) 14 coupled to the antenna 12 are shown in FIG. 1.

As illustrated in FIG. 1, the baseband processing device 10 comprises several analog baseband processing components 16, 18, 20, 22, 24, an ADC stage 26 as well as a digital baseband signal processor 28. The analog components comprise a first mixer stage 16 coupled to an output of the LNA 14, a first filter stage 18 coupled to the output of the first mixer stage 16, a second mixer stage 20 coupled to the output of the first filter stage 18, and a second filter stage 22 coupled to the output of the second mixer stage 20. The analog components further comprise a detector 24 coupled to the two mixer stages 16, 20 and configured to supply a frequency shift control signal.

The first mixer stage 16 is an RF device capable of down-converting an output signal of the LNA 14 to the baseband spectrum. In one example, the first mixer stage 16 is configured as a quadrature mixer. The first mixer stage 16 is additionally configured to impress a first frequency shift (or frequency offset) on the resulting baseband signal during the down-conversion as will be described in more detail below.

The two analog baseband filter stages 18, 22 have an identical configuration and each have a low-pass characteristic with an identical characteristic cut-off frequency. In the present embodiment, the fixed filter bandwidth (or passband) of each of the two filter stages 18, 22 is selected to correspond to the maximum bandwidth capability of a mobile communications system. In an LTE system for example, the filter bandwidth of each of the two filter stages 18, 22 may thus be set to 20 MHz (or to a fixed smaller value in 1.25 MHz steps). In other implementations, the bandwidth of the two filter stages 18, 22 may be selected to have a fixed value ranging between 1 MHz and 50 MHz.

The second mixer stage 20 acts as frequency shifter and impresses a further frequency shift on the output signal of the first filter stage 18. While the first mixer stage 16 is a RF device, the second mixer stage 20 operates in the baseband spectrum. This fact opens a wide range of implementation possibilities for the second mixer stage 20. For example, the second mixer stage 20 may be realised using four quadrant mixers, and a Local Oscillator (LO) signal for the second mixer stage 20 may be generated digitally.

The detector 24 is adapted to determine a designated signal bandwidth of the baseband signal processed by the baseband processing device 10. As has been mentioned above, the designated signal bandwidth of the baseband signal that is to be processed by the baseband processing device 10 corresponds to the bandwidth of the baseband signal as generated on a transmitter side. If the specific communications standard defines a fixed signal bandwidth for the baseband signal, the detector 24 may be omitted (since the signal bandwidth may then a priori be known to the device 10). If, on the other hand, the specific communications standard (such as LTE) allows two or more signal bandwidths to be utilised on the transmitter side, the detector 24 operates to determine the baseband signal bandwidth currently in use and to control the two mixer stages 16, 22 accordingly. If, for example, the baseband signal bandwidth currently in use is signalled via a downlink broadcast channel as in the LTE standard, the detector 24 may be configured to listen to this downlink channel to determine the designated signal bandwidth of the baseband signal.

The operation of the baseband processing device 10 shown in FIG. 1 will now be described in more detail with reference to the frequency diagrams of FIGS. 1a-1e and the schematic flow chart 200 of FIG. 2.

FIG. 1a illustrates the spectrum of the RF output signal of the LNA 14. As can be seen, the output signal is centred around RF frequency $f_{RF}$. The RF output signal comprises a useful signal portion as well as interference components located in the vicinity of the band edges of the useful signal portion. In an exemplary LTE scenario, the useful signal portion may correspond to an LTE signal having a bandwidth of, for example, 5 MHz, and the lateral interference components are the result of narrow band signals (e.g. GSM signals) located very close to the LTE band edge. The task of the baseband processing device 10 as illustrated in FIG. 1 basically relates to removing the interference component illustrated in FIG. 1a so as to improve the receiver blocking capability.

The output signal of the LNA 14 is fed to the first mixer stage 16. The first mixer stage 16 down-converts the RF output signal of the LNA 14 to the baseband spectrum. During the down-conversion, the first mixer stage 16 additionally impresses a first frequency shift on the resulting baseband signal, that will eventually be output by the first mixer stage 16, as shown in FIG. 1b. This first frequency shift is adjusted to be equal to the difference between the designated signal bandwidth of the baseband signal and the band edge of the following filter stage 18. If $BW_S$ is the designated signal bandwidth of the baseband signal and $BW_F$ is the bandwidth of the baseband filter stage 18, the frequency shift impressed by the first mixer stage 18 can be expressed as $(BW_F - BW_S)/2$ under the assumption of a complex-valued baseband signal centred around 0 Hz.

The frequency shifted baseband signal output by the first mixer stage 16 is fed to the first filter stage 18. Due to the frequency shift of the baseband signal into one corner of the passband of the filter stage 18, the interference components are removed on the corresponding side of the baseband signal since the values of $BW_F$ and $BW_S$ have been selected to move the baseband signal as far as possible into the stop band region of the filter stage 18. The resulting filtering operation becomes apparent from the diagram of FIG. 1c, which also illustrates the low-pass filter characteristic of the filter stage 18 having a filter bandwidth of $BW_F$. As a result of the filtering operation performed by the filter stage 18, any interference components behind a first band edge of the frequency shifted baseband signal are removed (see step 202 of the flow chart 200 of FIG. 2).

The output signal of the first filter stage 18 is fed to the second mixer stage 20, which acts as a frequency shifter and shifts the filtered baseband signal by a second frequency shift in a second frequency direction opposite the direction of the first frequency shift impressed by the mixer stage 16 (step 204 in flow chart 200 of FIG. 2). The second frequency shift impressed by the mixer stage 20 corresponds to twice the first frequency shift impressed by the mixer stage 18, but occurs in the opposite direction. Since the absolute value of the first frequency shift amounted to $(BW_F - BW_S)/2$, the absolute value of the second frequency shift thus amounts to $(BW_F - BW_S)$. The resulting output signal of the mixer stage 20 is illustrated in FIG. 1d.

Due to the second frequency shift impressed on the baseband signal by the mixer stage 20, the baseband signal is shifted into the other corner of the common passband of both filter stages 18, 22. As a result, the second filter stage 22 removes interference components behind the second band edge of the designated signal bandwidth of the baseband signal (step 206 in the flow chart 200 of FIG. 2). The resulting baseband signal output by the filter stage 22 is illustrated in FIG. 1e.

This output signal is fed to the ADC stage 26 and converted to the digital signal domain. The digital signal processor 28 than re-centres the baseband signal by impressing a further frequency shift of $(BW_F - BW_S)/2$ in the direction of the frequency shift applied by the first mixer stage 16. This re-centring could alternatively be performed in the analog domain by a further mixer stage (not shown) located between the second filter stage 22 and the ADC stage 26.

FIG. 3 illustrates a possible implementation of the mixer stages 16, 20, the filter stages 18, 22 and the ADC stage 26 of the baseband processing device 10 shown in FIG. 1. It is assumed here that the mixer stage 16 is configured as a direct conversion quadrature mixer producing two quadrature signal components. Each of the two quadrature signal components is then baseband processed in a dedicated signal processing branch as illustrated in FIG. 3.

It is further assumed that the LO signal of the mixer stage 16 has a frequency equivalent to $-\omega_{RF} + \Delta\omega$, which places the baseband signal at the right corner of the passband of the following filter stage 18 (see FIG. 1c). The value of $\Delta\omega$ corresponds to $(BW_F - BW_S)/2$ and is signalled to the mixer stage 18 by the detector 24 as discussed above in context with FIG. 1.

The mixer stage 16 generates two quadrature components i(t) and q(t) as is known in the art. These quadrature components i(t) and q(t) are then individually filtered in the first filter stage 18 before the filtered baseband signal will be shifted to the left corner of the passband in the following mixer stage 20 by a frequency shift corresponding to $2\Delta\omega$ as shown in FIG. 1. The configuration of the processing branches of the mixer stage 20 is a result of the following mathematical considerations:

Let $c(t) = \cos(2\Delta\omega\tau)$ and $s(t) = \sin(2\Delta\omega\tau)$, then the operation that has to be performed by the mixer stage 20 can be expressed as:

$$i'(t)+jq'(t)=[i(t)+jq(t)]*[c(t)-js(t)]=[i(t)*c(t)+q(t)*s(t)]+j[q(t)*c(t)-i(t)*s(t)] \quad (1)$$

Comparing the coefficients yields the following:

$$i'(t)=i(t)*c(t)+q(t)*s(t) \text{ and} \quad (2)$$

$$q'(t)=q(t)*c(t)-i(t)*s(t). \quad (3)$$

As a result of equations (2) and (3), a configuration of the filter stage 20 as illustrated in FIG. 3 follows. Specifically, the mixer stage 20 comprises two parallel quadrant mixers $20_1$, $20_2$ and $20_3$, $20_4$ in each signal branch. Each of the mixers $20_1$ to $20_4$ is fed with a LO signal, a frequency of which is controlled by the detector 24 shown in FIG. 1. The mixer stage 20 further comprises one adder $20_5$, $20_6$ in each signal branch for adding the output signals of mixers $20_1$, $20_3$ and $20_2$, $20_4$ respectively, such that the two quadrature signal components of equations (2) and (3) are obtained.

The output signals of the two signal branches of the mixer stage 20 are then individually filtered in the filter stage 22 and individually converted into the digital signal domain by the ADC stage 26 as shown in FIG. 3.

As has become apparent from the above description of preferred embodiments, a baseband processing approach which improves receiver blocking capabilities is provided. The baseband processing approach can be implemented using fixed filters, so that the effort of switchable filters can be avoided. Additionally, ADC resolution requirements are considerably relaxed since no extra dynamic range for in-band blocking signals has to be provided. The baseband processing approach can be easily adjusted to one of a plurality of baseband signal bandwidths by providing a detector capable of controlling the LO frequencies of the mixer stages. The present solution can be easily implemented in receivers of an LTE system or any other wideband system.

While in the above embodiments the baseband signal has first been shifted to the right corner of the filter passband and then to the left corner, the shifting can, of course, also be performed in the opposite order. In such a case, the sign of s(t) in equations (1), (2) and (3) becomes negative.

While the current invention has been described in relation to its preferred embodiments, it is to be understood that this disclosure is for illustrative purposes only. Accordingly, it is intended that the invention be limited only by the scope of the claims appended hereto.

The invention claimed is:

1. A baseband processing device adapted to process a complex-valued baseband signal in an analog signal domain to laterally remove interference components, wherein the baseband signal has a designated signal bandwidth defined by two opposite band edges and wherein a first frequency shift in a first frequency direction is impressed on the baseband signal, the device comprising:
   a first filter stage adapted to filter the baseband signal exhibiting the first frequency shift to remove interference components behind a first band edge;
   a frequency shifter stage adapted to shift the filtered baseband signal by a second frequency shift in a second frequency direction opposite the first frequency direction; and
   a second filter stage adapted to filter the baseband signal exhibiting the second frequency shift to remove interference components behind a second band edge.

2. The device of claim 1, wherein the absolute value of the second frequency shift amounts to twice the absolute value of first frequency shift.

3. The device of claim 2, wherein the first frequency shift amounts to $\frac{1}{2}(BW_F-BW_S)$ and wherein the second frequency shift amounts to $(BW_F-BW_S)$, with $BW_F$ being a system parameter, $BW_S$ being the designated signal bandwidth and $BW_F > BW_S$.

4. The device of claim 3, wherein the first filter stage and the second filter stage each have a low-pass characteristic with a filter bandwidth $BW_F$.

5. The device of claim 3, wherein the filter bandwidth $BW_F$ is selected to correspond to a bandwidth capability of a mobile communications system.

6. The device of claim 1, wherein the first filter stage and the second filter stage each have a fixed filter characteristic.

7. The device of claim 1, further comprising a detector adapted to determine the designated signal bandwidth, the detector being coupled to the frequency shifter stage to control the second frequency shift in accordance with the determined designated signal bandwidth.

8. The device of claim 1, further comprising a down-converter adapted to down-convert a Radio Frequency (RF) signal to produce the baseband signal.

9. The device of claim 8, wherein the down-converter is adapted to additionally impress the first frequency shift on the RF signal during down-conversion.

10. The device of claim 1, further comprising a further frequency shifter stage arranged upstream of the first filter stage, the further frequency shifter stage being adapted to impress the first frequency shift on the baseband signal.

11. The device of claim 1, further comprising an analog-to-digital converter stage adapted to convert an output signal of the second filter stage to a digital signal domain.

12. The device of claim 11, further comprising a signal processor located in the digital signal domain and adapted to compensate at least one of the first frequency shift and the second frequency shift.

13. The device of claim 1, wherein the baseband signal includes two quadrature signal components, and wherein the device comprises a dedicated signal processing branch for each quadrature signal component, with the first and second filter stages and the frequency shifter stage stretching across the two signal branches.

14. A method of processing a complex-valued baseband signal in an analog signal domain to laterally remove interference components, wherein the baseband signal has a designated signal bandwidth defined by two opposite band edges and wherein a first frequency shift in a first frequency direction is impressed on the baseband signal, the method comprising the steps of:
   subjecting the baseband signal exhibiting the first frequency shift to a first filtering operation to remove interference components behind a first band edge;
   shifting the filtered baseband signal by a second frequency shift in a second frequency direction opposite the first frequency direction; and,
   subjecting the baseband signal exhibiting the second frequency shift to a second filtering operation to remove interference components behind a second band edge.

15. The method of claim 14, wherein the first frequency shift amounts to $\frac{1}{2}(BW_F-BW_S)$ and wherein the second frequency shift amounts to $(BW_F-BW_S)$, with $BW_F$ being a system parameter, $BW_S$ being the designated signal bandwidth and $BW_F > BW_S$.

16. The method of claim 15, wherein the first filtering operation and the second filtering operation each have a low-pass characteristic with a filter bandwidth $BW_F$.

17. The method of claim 16, wherein the filter bandwidth $BW_F$ is selected to correspond to a bandwidth capability of a mobile communications system.

18. The method of claim 14, further comprising the steps of:
   determining the designated signal bandwidth; and,
   controlling the second frequency shift in accordance with the determined designated signal bandwidth.

* * * * *